United States Patent [19]

Gunnarsson

[11] 4,219,065

[45] Aug. 26, 1980

[54] SKIDDING AND/OR TIRE PROTECTOR

[75] Inventor: Karl E. Gunnarsson, Västervik, Sweden

[73] Assignee: Gunnebo Bruks Aktiebolag, Gunnebobruk, Sweden

[21] Appl. No.: 933,644

[22] Filed: Aug. 14, 1978

Related U.S. Application Data

[63] Continuation of Ser. No. 733,376, Oct. 18, 1976, abandoned.

[51] Int. Cl.² .................... B60C 11/00; B60C 27/00
[52] U.S. Cl. .................................. 152/243; 59/85
[58] Field of Search ................ 152/243–244, 152/239, 171, 173, 178, 180, 185, 190, 241, 242; 59/85–87

[56] References Cited

U.S. PATENT DOCUMENTS

| | | | |
|---|---|---|---|
| 1,734,830 | 11/1929 | Roth | 59/85 |
| 3,382,906 | 5/1968 | Müller et al. | 152/243 |
| 3,481,383 | 12/1969 | Gower | 152/243 |
| 3,490,511 | 1/1970 | Müller et al. | 152/243 |
| 3,768,534 | 10/1973 | Gower | 152/243 |
| 3,783,923 | 1/1974 | Dohmeier | 152/243 |
| 3,871,431 | 3/1974 | Dohmeier | 152/243 |
| 3,892,268 | 7/1975 | Asbeck | 152/243 |
| 3,918,505 | 11/1975 | Müller | 152/243 |
| 4,020,885 | 5/1977 | Sato | 152/243 |

*Primary Examiner*—Robert G. Sheridan
*Assistant Examiner*—Lawrence E. Williams
*Attorney, Agent, or Firm*—Hane, Roberts, Spiecens & Cohen

[57] ABSTRACT

A tire protector for reducing wear on the tires of heavy vehicles consisting of two or more parallel rows of spaced apart chain links. These links are joined by couplings members and consist of metal bars or wires which are bent so that they encircle each two chain links and that the ends of the bars or wires overlap side by side. These overlapping ends are positioned to face upwardly and flat when the protector is mounted to a tire. As a result only a relatively small area comes continually with contact with the ground and is thus exposed to wear and tear. This contacting area is strongly enforced due to the thickness of the sidewise overlapping ends, as a result, parts of the protector, such as the chain links and the bars or wires which form the coupling member, can be made fairly thin as they are not exposed to considerable wear thereby reducing the overall cost of producing the protector and also extending its lifetime.

4 Claims, 5 Drawing Figures

SKIDDING AND/OR TIRE PROTECTOR

This is a continuation of application Ser. No. 733,376, filed Oct. 18, 1976, now abandoned.

The present invention refers to an anti-skid tire protector for heavy vehicles. The involved vehicles are mainly those which are used in connection with mining. Such vehicles are fitted with large wheels, the tires at which are very expensive. When driving on splinters such tires are exposed to cutting and stump damage. It is therefore desirable to try to protect these expensive tiresin the best possible way, and a protector has been constructed which was placed over the tread and the side surface of the tires. Such protectors usually consist of chains which are linked together into more or less a network which protects the tire as much as possible. However, it has been found that such protectors for tires have too short a life because the chains are not sufficiently durable.

An object of the present invention is to provide a tire protector which is constructed in such a way that its durability is markedly increased in proportion to earlier tire protectors, and this is acquired through the present invention, which applies chains which are placed upright and where the ends of the chains overlap each other, and in this way the contact area of the chain against the ground is doubled. These chains are kept upright by means of connecting rings which form part of the protection. In the following description, the upright chains with overlapping ends are called the wearing part.

The wearing part according to the present invention consists of a bar or wire made of any cross section, which has been bent into a loop, so that the ends of the bars or wires are overlapping and at a level which is mainly at right angles to the opening of the loop.

According to the invention, the overlapping ends can be of a length of up to or exceeding the total length of the loop formed. According to the invention, it is suitable to remove the ends of the overlapping end parts.

According to the invention, the overlapping ends can be welded together or joined together in any suitable way. Further characteristics of the present invention are set forth in the following claims.

DESCRIPTION OF THE DRAWINGS

The present invention will be described in detail in connection with the drawings, wherein.

DETAILED DESCRIPTION

Figure 1:
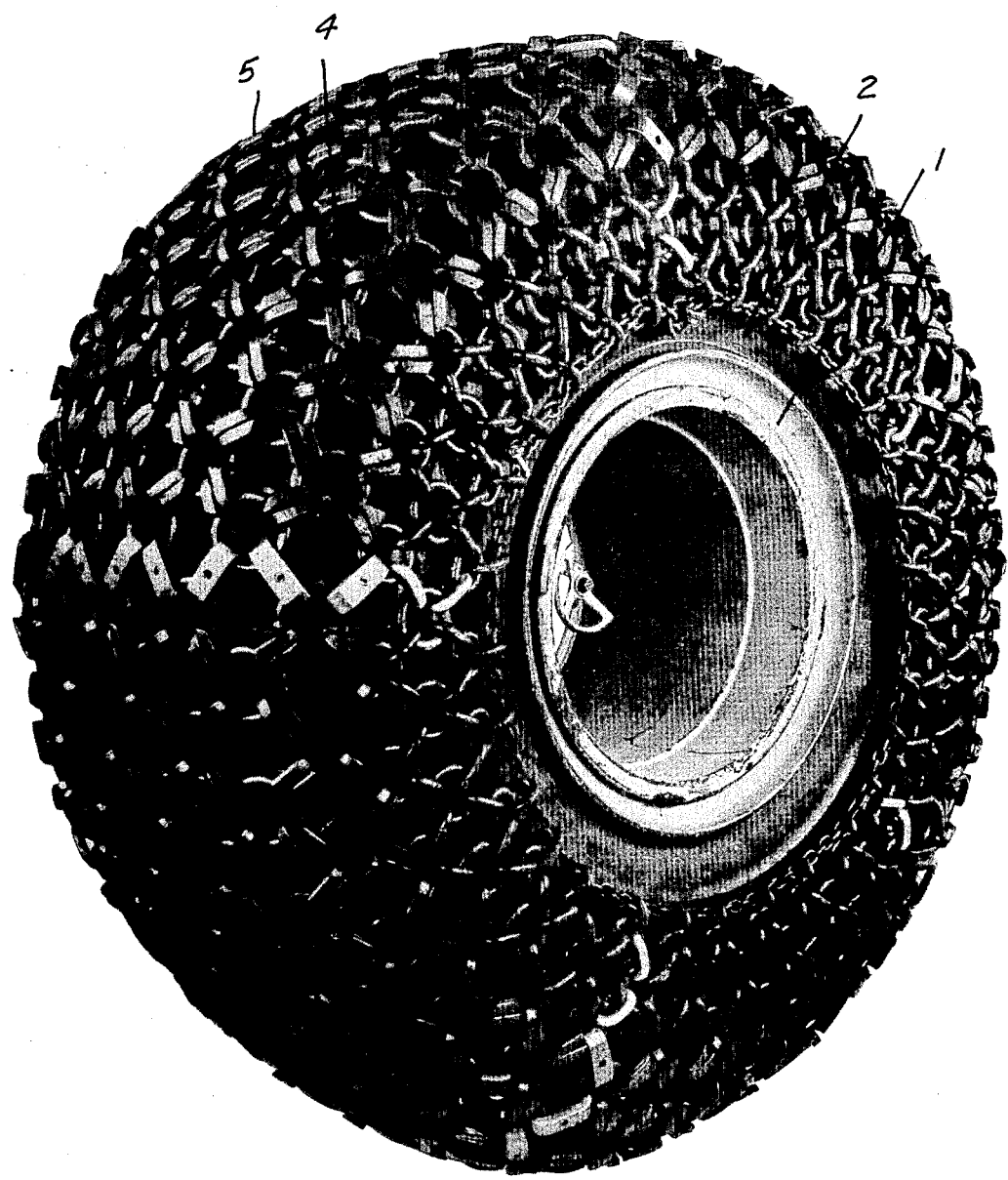
FIG. 1 shows one wheel fitted with a tire protector according to the presentinvention.
Figure 2:
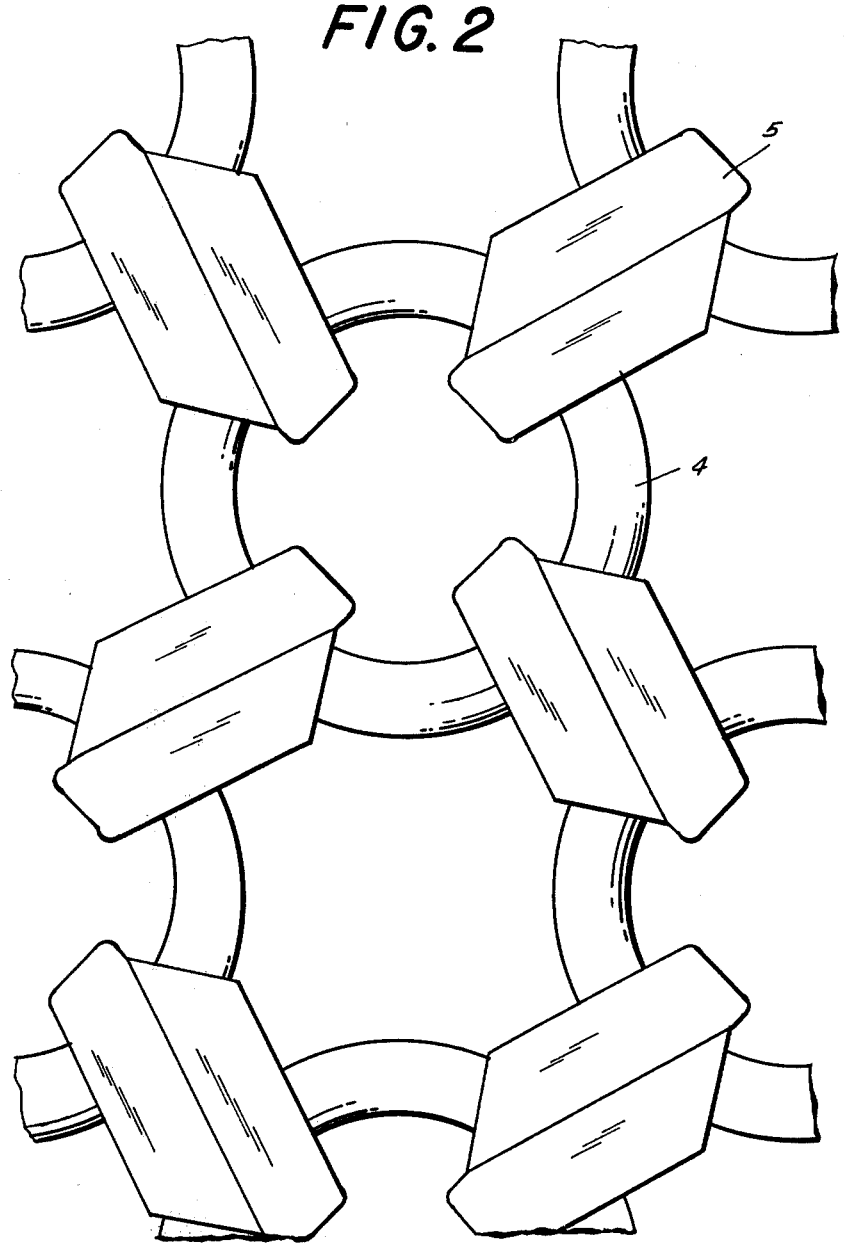
FIG. 2 shows part of the tire protector in accordance with FIG. 1, which part is to be placed on the tread of the tire.
Figure 3:
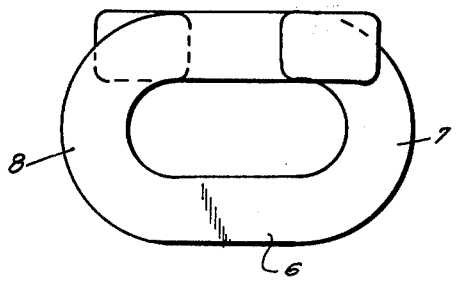
FIG. 3 shows a wearing part seen from the side.
Figure 4:
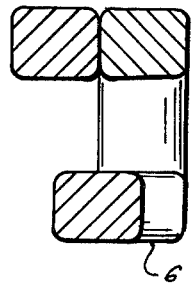
FIG. 4 shows a cross section of a wearing part in accordance with FIG. 3.
Figure 5:
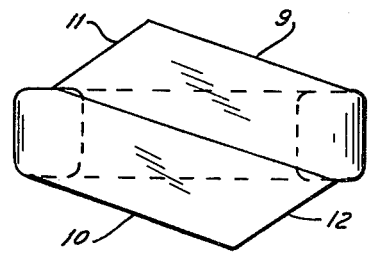
FIG. 5 shows the wearing part in accordance with FIG. 3 as seen from above.

Referring to FIG. 1, this figure shows a wheel rim 1 with a tire 2. The tread surface and side surfaces are covered by an anti-skid and/or tire protector formed of a number of chain links 4, the chain links can be circular or oval. The chains, especially when circular, maintain a number of wearing parts 5 in an upright position. Each wearing part is made of a bar or wire of any cross section, which bar or wire has been bent into a chain or loop as appears from FIG. 3. The ends of the wire or bar overlap each other as appears from FIG. 5. The overlapping can be along the total length of the chain and it may even exceed this. In FIG. 3 the bent chain link is oval, and it has a bottom longitudinal side 6 and a top logitudinal side made of the ends of the wire or the bar respectively, which ends have the reference numerals 9 and 10.

The ends each have edges 11 and 12 and they are suitably welded next to each other. Of course, other ways of linking the two overlapping ends to each other are possible. The traversing sides of the chain have the reference numerals 7 and 8. As evident from FIG. 5, the overlapping ends are inclined at an angle with respect to the plane of the loop and thus are inclined with respect to the line of action formed by the loop ends 7 and 8 engaged on the links 4.

As appears from the drawings, it has thus been possible due to the design of the wearing part 5 to provide twice as much wearing surface of a chain forming part of a tire protector, and in this way the life of the tire protector has been increased.

What I claim is:

1. An anti-skid and anti-wear protector chain for a truck tire, said protector chain comprising:

a string of spaced apart chain links in the form of a closed loop; and a plurality of anti-skid and anti-wear members coupling adjacent chain links, each of said coupling members consisting of an elongate bar bent out of plane to form a loop with overlapping side-by-side disposed ends thereby defining a space within each of the coupling members, said overlapping ends having flat outer surfaces so as to form an outer crosswise surface larger and wider than the remaining portions of the loops and lengthwise fixedly secured in contact to each other so that said outer surfaces are disposed in a common outwardly facing plane extending substantially parallel to the surface of the tire, each of said coupling members encompassing two adjacent chain links thereby coupling the links to each other, the space within the coupling members and the cross-sectional shape of the chain links being correlated so that the overlapping ends of each of the coupling members are locked in a fixed position relative to the links and the outwardly facing surfaces of the overlapping ends are disposed in substantially the same direction in said common plane relative to the associated chain link and at an angle with respect to said loop.

2. The tire protector according to claim 1 and comprising at least a second strip of spaced apart chain links parallel to the links of the first strip spaced apart intermediate the links of the first strip and in the same plane, said coupling members coupling the links of the first strip to the links of the second strip.

3. The tire protector according to claim 1 wherein the overlapping ends of the coupling members are welded to each other.

4. The tire protector according to claim 1 wherein the space formed within the coupling members has a generally oval configuration, the inner long axis of said oval space being at least equal to the combined crosswise area of each two chain links joined by one of said coupling members.

* * * * *